US012744388B2

(12) United States Patent
Salter et al.

(10) Patent No.: US 12,744,388 B2
(45) Date of Patent: Sep. 22, 2026

(54) STRATEGIC RATIONING OF VEHICLE ENERGY FOR SUPPORTING HOUSEHOLD LOADS DURING POWER OUTAGES

(71) Applicant: FORD GLOBAL TECHNOLOGIES, LLC, Dearborn, MI (US)

(72) Inventors: Stuart C. Salter, White Lake, MI (US); Ryan O'Gorman, Beverly Hills, MI (US); Seth Anthony Bryan, Royal Oak, MI (US); Peter Phung, Windsor (CA); William David Treharne, Ypsilanti, MI (US); Katherine Howard-Cone, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1193 days.

(21) Appl. No.: 17/568,786

(22) Filed: Jan. 5, 2022

(65) Prior Publication Data

US 2023/0216304 A1 Jul. 6, 2023

(51) Int. Cl.
*H02J 3/32* (2026.01)
*B60L 53/30* (2019.01)
(Continued)

(52) U.S. Cl.
CPC ........... *H02J 3/322* (2020.01); *B60L 53/305* (2019.02); *B60L 53/66* (2019.02); *B60L 53/68* (2019.02); *B60L 55/00* (2019.02); *B60L 58/13* (2019.02); *G06F 1/263* (2013.01); *G06F 1/30* (2013.01); *H02J 3/17* (2026.01); *H02J 9/06* (2013.01); *H02J 2105/12* (2026.01);
(Continued)

(58) Field of Classification Search
CPC .... H02J 3/322; H02J 9/06; H02J 3/144; H02J 2310/60; B60L 53/68; B60L 55/00; B60L 53/66; B60L 53/305; B60L 58/13; G06F 1/263; G06F 1/30; G06F 307/66; Y04S 20/248; Y04S 10/126; Y04S 20/222; Y02B 70/3225
USPC .......................................................... 320/109
See application file for complete search history.

(56) References Cited

U.S. PATENT DOCUMENTS 8,866,333 B2 10/2014 Kamachi
10,913,374 B2 * 2/2021 Son ........................ B60L 55/00
(Continued)

OTHER PUBLICATIONS

Matt Casale, "How Electric Vehicles Could Help Keep the Power on During Blackouts, " Feb. 24, 2021, four pages, https://uspirg.org/blogs/usp/how-electric-vehicles-could-hel-keep-power-during-blackouts.

*Primary Examiner* — Julian D Huffman
*Assistant Examiner* — Sadia Kousar
(74) *Attorney, Agent, or Firm* — David B. Kelley; Carlson, Gaskey & Olds, P.C.

(57) ABSTRACT

Systems and methods are provided for coordinating and providing bidirectional energy transfer events between electrified vehicles and households or other structures, such as for supporting household loads associated with the structures during power outage conditions. In some implementations, available energy may be rationed from the vehicle to the structure based on a power outage restoration estimate. Rather than supporting household loads with constant energy during power outage conditions, the disclosed systems/methods may provide strategic rationing of bidirectional energy transfer in order to extend appliance operation for the duration of power outage conditions.

20 Claims, 7 Drawing Sheets

(51) Int. Cl.

| | |
|---|---|
| ***B60L 53/66*** | (2019.01) |
| ***B60L 53/68*** | (2019.01) |
| ***B60L 55/00*** | (2019.01) |
| ***B60L 58/13*** | (2019.01) |
| ***G06F 1/26*** | (2006.01) |
| ***G06F 1/30*** | (2006.01) |
| *H02J 3/17* | (2026.01) |
| *H02J 9/06* | (2006.01) |
| *H02J 105/12* | (2026.01) |
| *H02J 105/37* | (2026.01) |
| *H02J 105/52* | (2026.01) |

(52) U.S. Cl.

CPC ....... *H02J 2105/37* (2026.01); *H02J 2105/52* (2026.01); *Y02B 70/3225* (2013.01); *Y04S 10/126* (2013.01); *Y04S 20/222* (2013.01); *Y04S 20/248* (2013.01)

(56) References Cited

U.S. PATENT DOCUMENTS

| | | | | |
|---|---|---|---|---|
| 2010/0017045 | A1* | 1/2010 | Nesler | B60L 53/665 700/295 |
| 2017/0050529 | A1 | 2/2017 | Lambert et al. | |
| 2019/0308509 | A1* | 10/2019 | Herman | B60L 53/35 |
| 2023/0104157 | A1* | 4/2023 | Salter | B60L 58/12 307/10.1 |
| 2023/0202329 | A1* | 6/2023 | Bahei-Eldin | B60L 53/62 |

* cited by examiner

STRATEGIC RATIONING OF VEHICLE ENERGY FOR SUPPORTING HOUSEHOLD LOADS DURING POWER OUTAGES

TECHNICAL FIELD

This disclosure is directed to systems and methods for supporting critical household loads during power outage conditions by rationing available vehicle energy until power is restored.

BACKGROUND

Plug-in type electric vehicles include one or more charging interfaces for charging a traction battery pack. Plug-in type vehicles are typically charged while parked at a charging station or some other utility power source. Plug-in type vehicles can also be used to support household loads during electrical power outages.

SUMMARY

A bidirectional energy transfer system according to an exemplary aspect of the present disclosure includes, among other things, a traction battery pack, and a control module programmed to control a bidirectional energy transfer output from the traction battery pack based a power outage restoration estimate associated with a grid power source.

In a further non-limiting embodiment of the foregoing system, the control module is a component of a vehicle that is powered by the traction battery pack.

In a further non-limiting embodiment of either of the foregoing systems, the control module is a component of a cloud-based server system or a structure that is configured to receive the bidirectional energy transfer output from the traction battery pack.

In a further non-limiting embodiment of any of the foregoing systems, the control module is programmed to control the bidirectional energy transfer output from the traction battery pack to a structure for powering one or more electrical loads of the structure during a power outage condition of the grid power source.

In a further non-limiting embodiment of any of the foregoing systems, the structure is a household associated with a vehicle that is powered by the traction battery pack.

In a further non-limiting embodiment of any of the foregoing systems, the control module is further programmed to prepare a rationed energy transfer strategy for controlling the bidirectional energy transfer output from the traction battery pack to the structure.

In a further non-limiting embodiment of any of the foregoing systems, the rationed energy transfer strategy is determined based on household information associated with the structure, vehicle information associated with a vehicle that is powered by the traction battery pack, a strategic rationing profile preference selected by a user of the system, and the power outage restoration estimate.

In a further non-limiting embodiment of any of the foregoing systems, the strategic rationing profile preference includes a cycle/timer based implementation, a user input profile implementation, a home consumption implementation, or an appliance communication implementation.

In a further non-limiting embodiment of any of the foregoing systems, each of the cycle/timer based implementation, the user input profile implementation, the home consumption implementation, and the appliance communication implementation includes at least a low rationed strategy level, a minor rationed strategy level, a major rationed strategy level, and a critical rationed strategy level.

In a further non-limiting embodiment of any of the foregoing systems, the rationed energy transfer strategy is configured for powering the one or more electrical loads of the structure for a duration of the power outage condition.

In a further non-limiting embodiment of any of the foregoing systems, the power outage restoration estimate is derived from a cloud-generated power outage map.

In a further non-limiting embodiment of any of the foregoing systems, the power outage restoration estimate is derived from an announcement from a grid data server.

A method according to another exemplary aspect of the present disclosure includes, among other things, controlling, via a control module of a bidirectional energy transfer system, a bidirectional energy transfer output from a traction battery pack of a vehicle to a structure that is separate from the vehicle during a power outage condition of a grid power source. Controlling the bidirectional energy transfer output includes preparing a rationed energy transfer strategy that is derived, at least in part, based on a power outage restoration estimate associated with the grid power source.

In a further non-limiting embodiment of the foregoing method, the structure is a household associated with the vehicle.

In a further non-limiting embodiment of either of the foregoing methods, the rationed energy transfer strategy is further derived based on vehicle information associated with the vehicle and household information associated with the structure.

In a further non-limiting embodiment of any of the foregoing methods, the rationed energy transfer strategy is further derived based on a strategic rationing profile preference selected by a user of the bidirectional energy transfer system.

In a further non-limiting embodiment of any of the foregoing methods, the method includes determining a total energy requirement of the structure, determining an amount of energy available from the traction battery pack for supporting an electrical load of the structure, and determining a rationing strategy level for controlling the bidirectional energy transfer output from the traction battery pack to the structure based on whether or not the amount of energy available from the traction battery pack exceeds the total energy requirement of the structure.

In a further non-limiting embodiment of any of the foregoing methods, the method includes deriving the power outage restoration estimate from a cloud-generated power outage map.

In a further non-limiting embodiment of any of the foregoing methods, the method includes deriving the power outage restoration estimate from a grid data server associated with the grid power source.

In a further non-limiting embodiment of any of the foregoing methods, the rationed energy transfer strategy includes instructions for powering one or more electrical loads of the structure for a duration of the power outage condition.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to systems and methods for coordinating and providing bidirectional energy transfer events between electrified vehicles and households or other structures, such as for supporting household loads associated with the structures during power outage conditions. In some implementations, available energy may be rationed from the vehicle to the structure based on a power outage restoration estimate. Rather than supporting household loads with constant energy during power outage conditions, the disclosed systems/methods may provide for strategic rationing of bidirectional energy transfer in order to extend appliance operation for the duration of power outage conditions. These and other features of this disclosure are discussed in greater detail in the following paragraphs of this detailed description.

Figure 1:
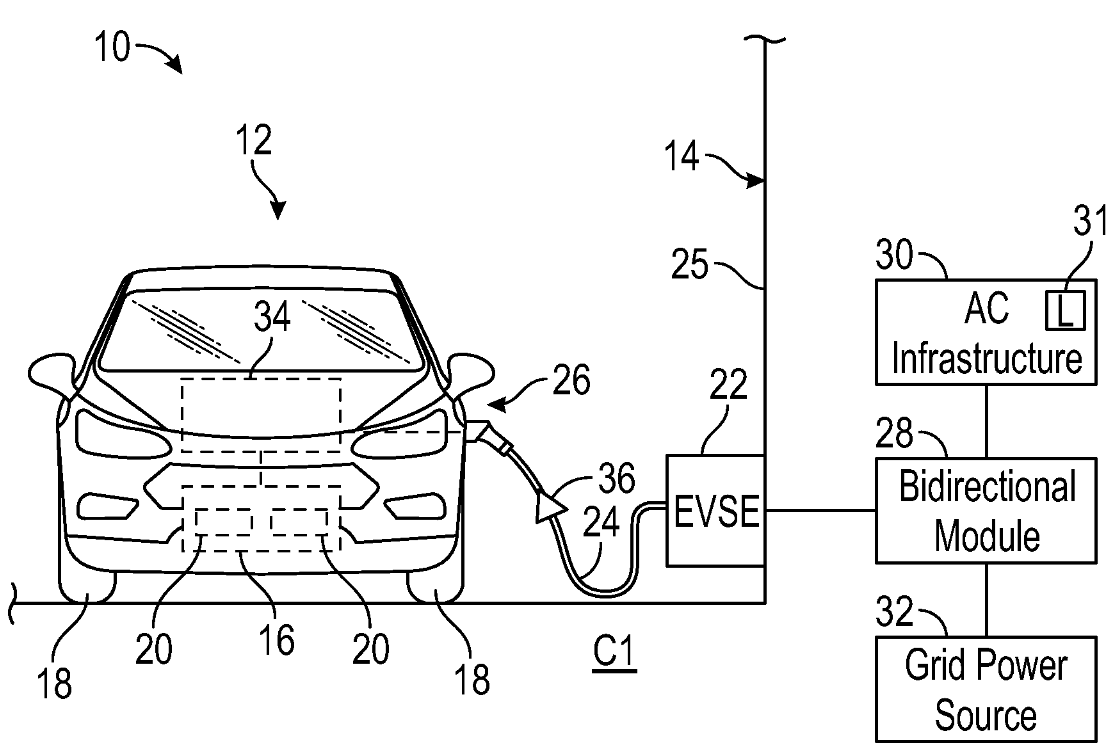
FIG. 1 schematically illustrates a first configuration of a bidirectional energy transfer system.
Figure 2:
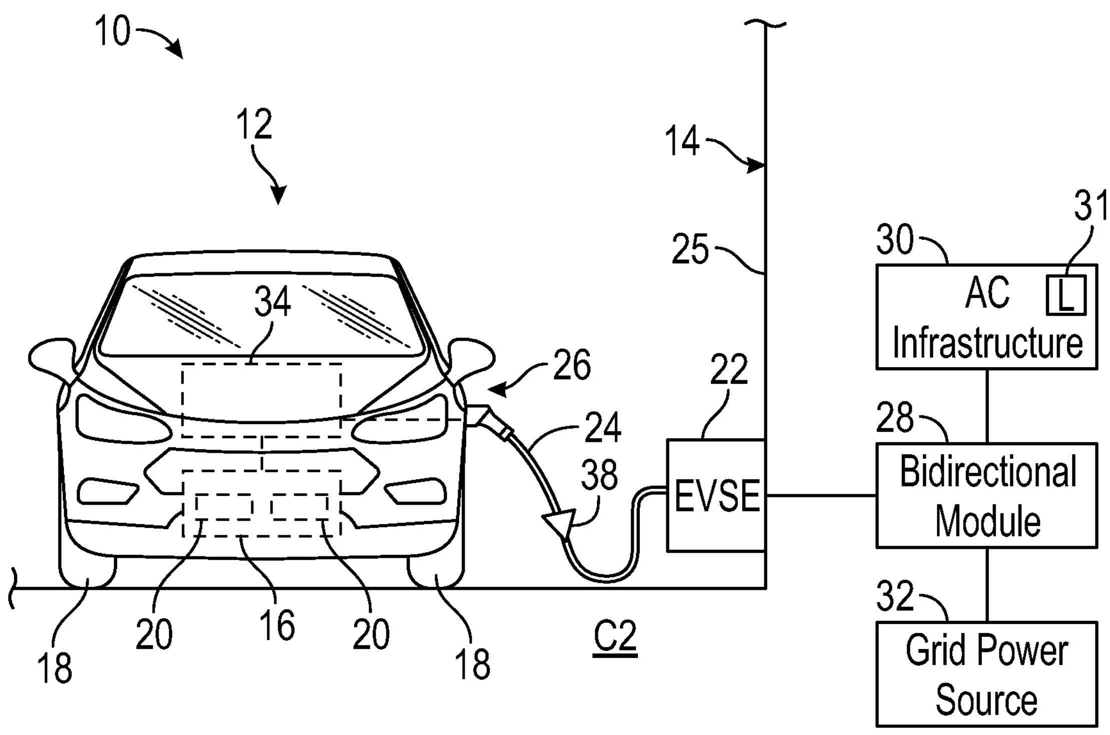
FIG. 2 schematically illustrates a second configuration of the bidirectional energy transfer system of FIG. 1.

FIGS. 1 and 2 schematically illustrate an exemplary bidirectional energy transfer system 10 (hereinafter "the system 10") for bidirectionally transferring energy between a vehicle 12 and a structure 14. The system 10 enables the bidirectional transfer of energy from the vehicle 12 to the structure 14 or vice versa. The structure 14 may be a residential building, a commercial building, a parking garage, a charging station, or any other type of structure that is capable of receiving or transferring energy. In an embodiment, the structure 14 is a residential household that functions as a "home location" of the vehicle 12.

Although a specific component relationship is illustrated in the figures of this disclosure, the illustrations are not intended to limit this disclosure. The placement and orientation of the various components of the depicted system are shown schematically and could vary within the scope of this disclosure. In addition, the various figures accompanying this disclosure are not necessarily drawn to scale, and some features may be exaggerated or minimized to emphasize certain details of a particular component.

In an embodiment, the vehicle 12 is a plug-in type electric vehicle (e.g., a plug-in hybrid electric vehicle (PHEV) or a battery electric vehicle (BEV)). The vehicle 12 includes a traction battery pack 16 that is part of an electrified powertrain capable of applying a torque from an electric machine (e.g., an electric motor) for driving drive wheels 18 of the vehicle 12. Therefore, the electrified powertrain of the vehicle 12 may electrically propel the set of drive wheels 18 either with or without the assistance of an internal combustion engine.

The vehicle 12 of FIGS. 1-2 is schematically illustrated as a car. However, other vehicle configurations are also contemplated. The teachings of this disclosure may be applicable for any type of vehicle as the vehicle 12. For example, the vehicle 12 could be configured as a car, a truck, a van, a sport utility vehicle (SUV), etc.

Although shown schematically, the traction battery pack 16 may be configured as a high voltage traction battery pack that includes a plurality of battery arrays 20 (e.g., battery assemblies or groupings of battery cells) capable of outputting electrical power to one or more electric machines of the vehicle 12. Other types of energy storage devices and/or output devices may also be used to electrically power the vehicle 12.

The vehicle 12 may interface with the structure 14 through an electric vehicle supply equipment (EVSE) 22 in order to perform bidirectional energy transfers of the system 10. In an embodiment, the EVSE 22 is a wall box that may be mounted to a wall 25 of the structure 14. A charge cable 24 may operably connect the EVSE 22 to a charge port assembly 26 of the vehicle 12 for transferring energy between the vehicle 12 and the structure 14. The charge cable 24 may be configured to provide any level of charging (e.g., 120 VAC, 240 VAC, Direct Current (DC) charging, etc.).

The EVSE 22 may be operably connected to an AC infrastructure 30 of the structure 14 through a bidirectional energy transfer module 28. Although shown separately from the EVSE 22 in FIG. 1, the bidirectional energy transfer module 28 and the EVSE 22 could be integrated together as part of common module.

Various electrical loads 31, such as household appliance loads, for example, may be associated with the AC infrastructure 30. The electrical loads 31 may sometimes be referred to as transient loads of the AC infrastructure 30 and could include loads associated with common kitchen appliances, washers, dryers, water heaters, air conditioning units, furnaces, home alarms systems, sump pump systems, routers, etc.

Power from a grid power source 32 (e.g., AC power, solar power, wind power, etc., or combinations thereof) and/or power from the vehicle 12 may be selectively transferred through the bidirectional energy transfer module 28. The bidirectional energy transfer module 28 is configured to aid the bidirectional transfers of electrical energy between the vehicle 12 and the structure 14. The bidirectional energy transfer module 28 may include various equipment, including but not limited to an AC/DC converter, a common HVDC bus, an isolation transformer, a DC/DC converter, a control module, etc. for configuring the structure 14 to either receive electrical energy from the vehicle 12 for supporting the electrical loads 31 or send electrical energy to the vehicle 12 for charging the traction battery pack 16. The bidirectional energy transfer module 28 may further be configured to transfer energy from the grid power source 32 to the AC infrastructure 30.

The vehicle 12 may include a vehicle power transfer system 34 configured for further enabling the bidirectional transfer of power between the vehicle 12 and the structure 14. The vehicle power transfer system 34 may be operably connected between the charge port assembly 26 and the traction battery pack 16 of the vehicle 12. The vehicle power transfer system 34 may include various equipment, such as a charger, a converter, HV relays or contactors, a motor controller (which may be referred to as an inverter system controller or ISC), etc. for configuring the vehicle 12 for either receiving electrical energy from the structure 14 or communicating electrical energy to the structure 14. The vehicle power transfer system 34 may additionally be configured to transfer energy between the traction battery pack 16 and one or more electric motors of the vehicle 12.

One non-limiting example of a suitable vehicle power transfer system that may be employed for use within the vehicle 12 for achieving bidirectional power transfers is disclosed within US Patent Publication No. 2020/0324665, assigned to Ford Global Technologies, LLC, the disclosure of which is incorporated herein by reference. However, other power transfer systems could also be utilized for achieving the bidirectional power transfers within the scope of this disclosure.

FIG. 1 schematically illustrates a first configuration C1 of the system 10. During the first configuration C1, power may be transferred from the structure 14 to the vehicle 12, such as for charging the traction battery pack 16 of the vehicle 12. The direction of energy transfer during the first configuration C1 is schematically depicted by arrow 36.

FIG. 2 schematically illustrates a second configuration C2 of the system 10. During the second configuration C2, power may be transferred from the traction battery pack 16 of the vehicle 12 to the structure 14. The direction of energy transfer during the second configuration C2 is schematically illustrated by arrow 38. In this way, the vehicle 12 may be employed as a backup energy storage system for powering the electrical loads 31 of the structure 14, such as when power from the grid power source 32 is temporarily unavailable as a result of electrical blackouts, for example.

As an additional aspect of the system 10, the vehicle 12 may be strategically controlled during bidirectional energy transfer events to support the critical household loads of the structure 14. For example, when power outage conditions occur such that energy from the grid power source 32 is temporarily unavailable, the system 10 may be controlled to support the critical functionality of all or portions of the electrical loads 31 by rationing available energy from the vehicle 12 until the grid power source 32 is restored, thereby ensuring essential household appliance operation and functionality for the duration of the power outage condition. These and other aspects of the system 10 are further detailed below.

Figure 3:
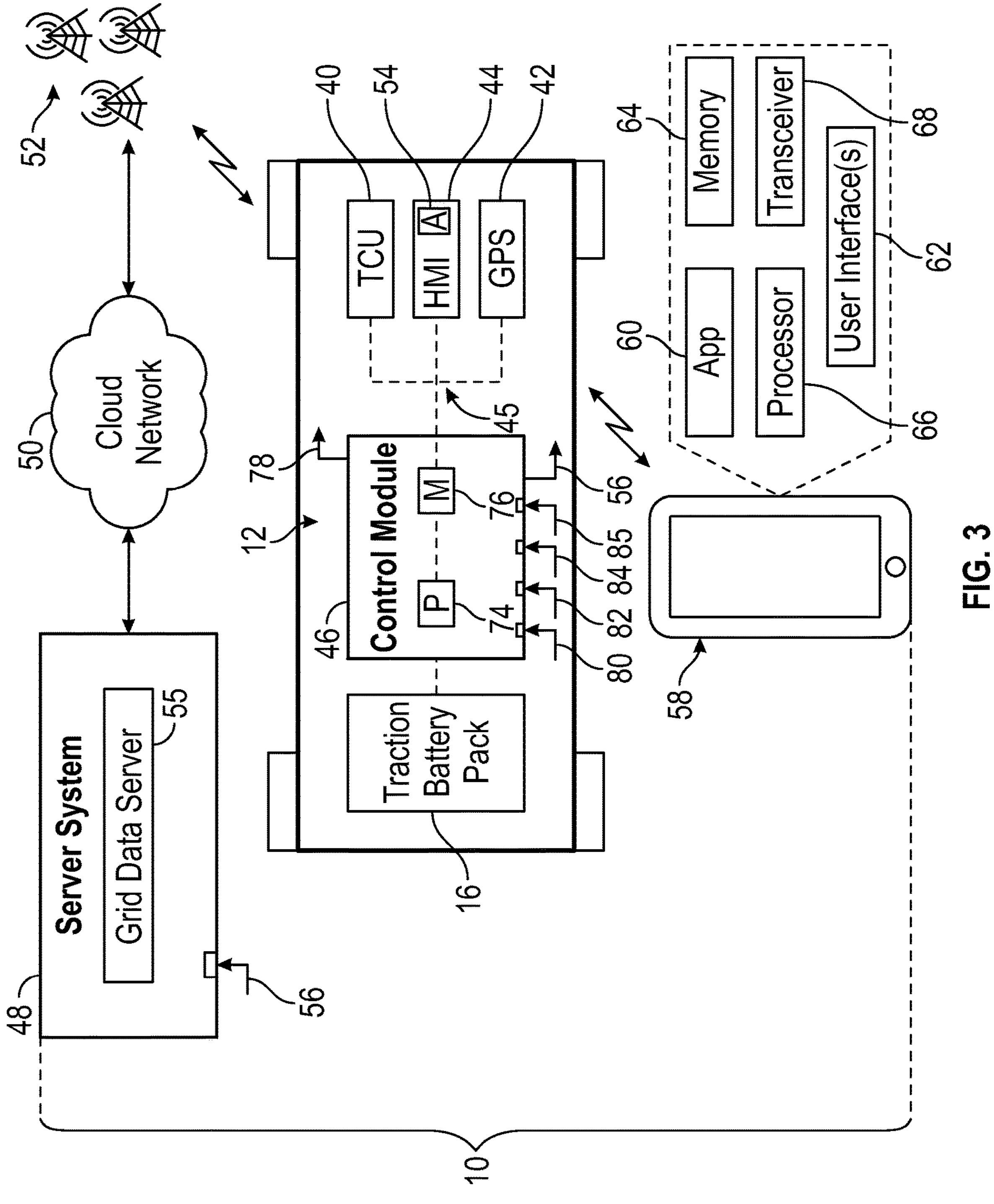
FIG. 3 schematically illustrates exemplary aspects of a bidirectional energy transfer system from the perspective of an electrified vehicle of the system.

Additional aspects of the system 10 of FIGS. 1-2 are further detailed from the perspective of the vehicle 12 in FIG. 3. In particular, FIG. 3 schematically illustrates select features that enable the system 10 to coordinate bidirectional energy transfer events between the vehicle 12 and the structure 14, such as by rationing available energy from the vehicle 12 to the structure 14 for strategically supporting the electrical loads 31 during power outage conditions and until the grid power source 32 has been restored, for example.

As further part of the system 10, the vehicle 12 may include a telecommunications module 40, a global positioning system (GPS) 42, a human machine interface (HMI) 44, and a control module 46. These and other components may be interconnected and in electronic communication with one another over a communication bus 45 of the vehicle 12. The communication bus 45 may be a wired communication bus such as a controller area network (CAN) bus, or a wireless communication bus such as Wi-Fi, Bluetooth®, Ultra-Wide Band (UWB), etc.

The telecommunications module 40 may be configured for achieving bidirectional communications with a cloud-based server system 48 of the system 10. The telecommunications module 40 may communicate over a cloud network 50 (e.g., the internet) to obtain various information stored on the server system 48 or to provide information to the server system 48 that can subsequently be accessed by the vehicle 12 (and/or other participating vehicles or structures of the system 10). The server system 48 can identify, collect, and store user data associated with the vehicle 12 for validation purposes. Upon an authorized request, data may be subsequently transmitted to the telecommunications module 40 via one or more cellular towers 52 or some other known communication technique (e.g., Wi-Fi, Bluetooth®, data connectivity, etc.). The telecommunications module 40 can receive data from the server system 48 or can communicate data back to the server system 48 via the cellular tower(s) 52. Although not necessarily shown or described in this highly schematic embodiment, numerous other components may enable bidirectional communications between the vehicle 12 and the server system 48.

The server system 48 may include various servers that store data that may be accessed by the system 10 in anticipation of strategically supporting the electrical loads 31 of the structure 14 during power outage conditions. In an embodiment, the server system 48 includes a grid data server 55. The grid data server 55 may store data related to the grid power source 32. For example, the grid-related data could include historical data such as prior power outage dates/times, power outage durations and/or average power outage duration per power outage condition, the type of energy generation (e.g., coal, natural gas, nuclear, wind turbine, solar, etc.) associated with the grid power source 32, announcements concerning scheduled blackouts, expected power outage duration, and/or other grid-related announcements related to power disruption conditions and expected power outage durations, etc. The grid data server 55 may be operated or managed by the utility service provider associated with the grid power source 32 at the location of the vehicle 12 and/or the structure 14, for example.

In a first embodiment, a user/owner of the vehicle 12 may interface with the server system 48 for coordinating bidirectional energy transfer related events using the HMI 44. For example, the HMI 44 may be equipped with an application 54 (e.g., FordPass™ or another similar web-based application) for interfacing with the server system 48. The HMI 44 may be located within a passenger cabin of the vehicle 12 and may include various user interfaces for displaying information to the vehicle occupants and for allowing the vehicle occupants to enter information into the HMI 44. The vehicle occupants may interact with the user interfaces presentable on the HMI 44 via touch screens, tactile buttons, audible speech, speech synthesis, etc.

In another embodiment, the user/owner of the vehicle 12 may alternatively or additionally interface with the server system 48 for coordinating bidirectional energy transfer related events using a personal electronic device 58 (e.g., a smart phone, tablet, computer, wearable smart device, etc.). The personal electronic device 58 may include an application 60 (e.g., FordPass™ or another similar application) that includes programming to allow the user to employ one or more user interfaces 62 for setting or controlling certain aspects of the system 10. The application 60 may be stored in a memory 64 of the personal electronic device 58 and may be executed by a processor 66 of the personal electronic device 58. The personal electronic device 58 may additionally include a transceiver 68 that is configured to communicate with the server system 48 over the cellular tower(s) 52 or some other wireless link.

The GPS 42 is configured to pinpoint locational coordinates of the vehicle 12. The GPS 42 may utilize geopositioning techniques or any other satellite navigation techniques for estimating the geographic position of the vehicle 12 at any point in time.

The control module 46 may include both hardware and software and could be part of an overall vehicle control system, such as a vehicle system controller (VSC), or could alternatively be a stand-alone controller separate from the VSC. In an embodiment, the control module 46 is programmed with executable instructions for interfacing with and commanding operation of various components of the system 10. Although shown as separate modules within the highly schematic depiction of FIG. 3, the telecommunications module 40, the GPS 42, the HMI 44, and the control module 46 could be integrated together as part of common module of the vehicle 12.

The control module 46 may include a processor 74 and non-transitory memory 76 for executing various control strategies and modes associated with the system 10. The processor 74 can be a custom made or commercially available processor, a central processing unit (CPU), or generally any device for executing software instructions. The memory 76 can include any one or combination of volatile memory elements and/or nonvolatile memory elements.

The processor 74 may be operably coupled to the memory 76 and may be configured to execute one or more programs stored in the memory 76 of the control module 46 based on the various inputs received from other devices, such as the server system 48, the structure 14, the telecommunications module 40, the GPS 42, the HMI 44, the traction battery pack 16, etc. In an embodiment, the application 54 (e.g., FordPass™ or another similar application), which includes programming for allowing the vehicle user to employ one or more user interfaces within the HMI 44 for setting or controlling certain aspects of the system 10, may be stored in the memory 76 and may be executed by the processor 74 of the control module 46. Alternatively, the control module 46 may be configured to communicate and interface with the personal electronic device 58 for coordinating and/or executing certain aspects of the system 10.

The control module 46 may receive and process various inputs in preparation for rationing energy from the vehicle 12 for supporting select all or portions of the electrical loads 31 of the structure 14 during power outage conditions of the grid power source 32. More particularly, the control module 46 may receive various inputs that may be utilized for preparing a rationed energy transfer strategy 78 that is most appropriate for any given structure/vehicle/grid condition. The rationed transfer energy strategy 78 may control how energy is ultimately transferred during the power outage condition.

A first input to the control module 46 may include household information 80 associated with the structure 14. The household information 80 may include pre-programmed or machine learning energy profiles for various home appliances that are part of the electrical loads 31, historical energy usage (e.g., energy logs) of the structure 14, smart meter readings (e.g., current consumption of total energy in readings through voltage, current, and power factor levels), smart appliance information (e.g., status of appliance use, notifications, energy profiles, energy use per unit of appliance usage, etc.), other appliance inputs (e.g., current sensor and temperature sensor information, etc.), customer preference information (e.g., customer energy transfer settings received from the applications 54, 60, etc.), etc.

Another input to the control module 46 may include vehicle information 82 received from various components/subsystems of the vehicle 12. The vehicle information 82 may include information such as the current charging status of the electrified vehicle (e.g., on-plug versus off-plug, current power transfer rate if on-plug, etc.), current state of charge (SOC) of the traction battery pack 16, estimated travel range of the vehicle 12, available bidirectional energy transfer capability of the traction battery pack 16, trip planner information (e.g., expected drive routes planned by the user), predefined range reserve information, etc.

Another input to the control module 46 may include a strategic rationing profile preference 85 selected by the user. The strategic rationing profile preference 85 helps inform how energy will be rationed from the vehicle 12 to the structure 14 for supporting the electrical loads 31 during the duration of the power outage condition.

A first exemplary strategic rationing profile preference 85 that may be selected by the user is a cycle/timer based implementation. The cycle/timer based implementation is a base predictive approach in which energy transfer from the vehicle 12 to the structure 14 is rationed based on a rudimentary timer that is set by the user or is automatically set. For example, energy transfer from the vehicle 12 to the structure 14 can be automatically initiated each time a predefined time interval has expired and can be performed for a predefined amount of time in order to ensure appropriate cycling of the electrical loads 31. Cycle/timer based implementation options include maintaining power transfer from the vehicle 12 to the structure 14 until household appliances return to within power outage settings and then stopping the power transfer, or automatically dynamically modifying the predefined time interval and predefined amount of time to keep the appliance constantly within settings.

Another exemplary strategic rationing profile preference 85 that may be selected by the user is a customer input profile implementation. The customer input profile implementation is an applied predictive approach in which energy transfer from the vehicle 12 to the structure 14 is rationed based on user selected energy consumption profiles. Thus, the amount of energy transferred from the vehicle 12 to the structure 14 may be matched to the predefined energy consumption profile during the bidirectional energy transfer event.

Another exemplary strategic rationing profile preference 85 that may be selected by the user is an appliance communication implementation. The appliance communication implementation is an arbitrative approach in which the amount of energy transferred from the vehicle 12 to the structure is based on direct communications between the control module 46 and smart household appliances of the electrical loads 31. The appliance communication implementation may include supporting interval status readings only (e.g., supplying power just long enough to obtain reading from critical appliances, and then taking no further action unless the appliance requires power to remain in power outage range, such as for maintaining a refrigerator or freezer within a desired temperature boundary, for example).

Yet another rationing implementation may support powering the electrical loads 31 without obtaining interval status readings from the household appliances. For example, vehicle sensor readings (e.g., exterior and interior temperature readings, rain sensing, etc.) may be leveraged to determine whether and how often any energy transfer action from the vehicle 12 to the structure 14 needs to be taken.

The above strategic rationing implementation types are to be interpreted as exemplary only. Other implementations for controlling bidirectional energy transfers could alternatively or additionally be provided and are contemplated within the scope of this disclosure.

Each of the plurality of strategic rationing implementations that are programmed within the control module 46 may further include various strategy levels. For example, each strategic rationing implementation could be executed as part of a low rationed strategy level, a minor rationed strategy level, a major rationed strategy level, and a critical rationed strategy level. These strategy levels may indicate different levels of energy transfer that will occur during bidirectional energy transfer events. In an embodiment, a relatively low amount of rationed energy transfer (e.g., reduced/constant/average energy transfer) will occur for the low rationed strategy level, a relatively minor amount of rationed energy transfer (e.g., interval/intermittent energy transfer) will occur for the minor rationed strategy level, a relatively high amount of energy transfer (e.g., as needed energy transfer) will occur for the major rationed strategy level, and a critical amount of energy transfer (e.g., extremely necessary energy transfer) will occur for the critical rationed strategy level.

Yet another input to the control module 46 may include a power outage duration estimate 84. The power outage duration estimate 84 may be an indication of the expected amount of time power is expected to be unavailable from the grid power source 32 during the power outage condition. A power outage restoration estimate may therefore be derived from the power outage duration estimate 84.

In an embodiment, the power outage duration estimate 84 is an estimate that is broadcast by the grid data server 55. For example, the control module 46 may infer how long power is expected to unavailable form the grid power source 32 directly from the grid data server 55 for deriving the power outage restoration estimate.

In another embodiment, the power outage duration estimate 84, and relatedly the power outage restoration estimate, is an estimated time value that may be derived from cloud generated aggregated power outage mapping. For example, the control module 46 may be configured to regularly broadcast vehicle data 56 at predefined time intervals to the server system 48 as part of a "heartbeat" status signal. The vehicle data 56 may be aggregated from other inputs received by the control module 46, such as the vehicle information 82 for example, and may include information such as the current charging status of the vehicle 12, the current GPS coordinates of the vehicle 12, etc.

The heartbeat status signals may be broadcast during bidirectional energy transfer sequences in which the vehicle 12 is operably connected to the structure 14 (or any other charging-enabled structure) via the EVSE 22 for exchanging energy therebetween. However, the vehicle data 56 could also be communicated to the server system 48 during off-plug conditions, such as when the vehicle 12 is away from the structure 14.

Figure 4:
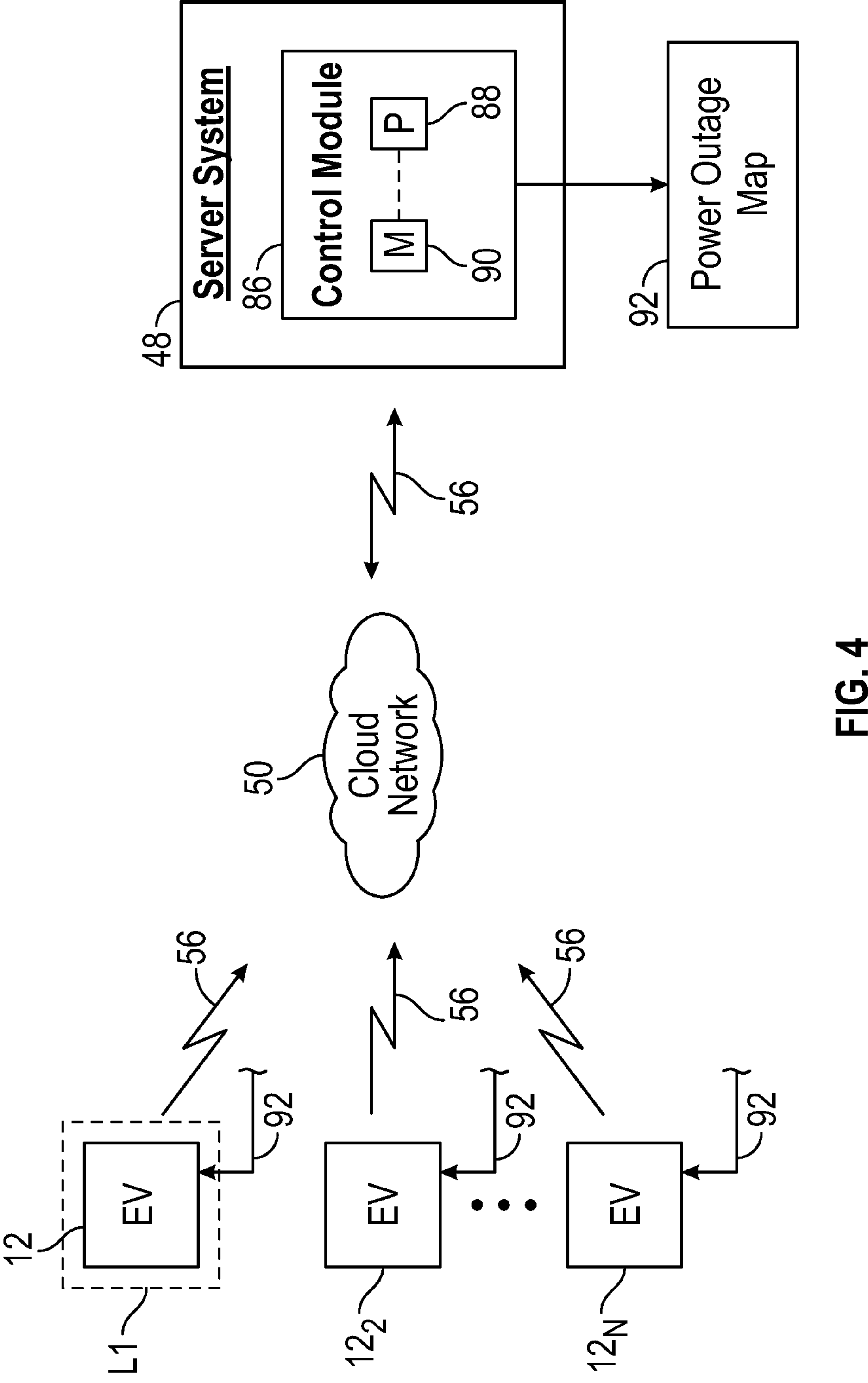
FIG. 4 schematically illustrates additional exemplary aspects of a bidirectional energy transfer system.

Referring now primarily to FIG. 4, a control module 86 of the server system 48 may be configured to receive the vehicle data 56 from the vehicle 12 and one or more additional electrified vehicles $\mathbf{12_2}$ to $\mathbf{12_N}$ (where "N" is any number) that is operably linked to the system 10 over the cloud network 50. The control module 86 of the server system 48 may be programmed to process the vehicle data 56 for performing various power outage mapping-related functions/actions.

The control module 86 of the server system 48 may include a processor 88 and memory 90 that is operably connected to the processor 88. Programming (e.g., software code) may be stored as executable instructions in the memory 90, and the executable instructions may be embodied within any computer readable medium that can be executed by the processor 88.

In an embodiment, the control module 86 is programmed to leverage the vehicle data 56 for performing aggregated power outage mapping functions. For example, when the vehicle data 56 indicates a loss of power while performing bidirectional energy transfer events at a charging location L1 of the vehicle 12, the control module 86 may automatically generate a power outage map 92 for indicating information such as the location and expected duration/restoration time of the power outage. The power outage map 92 may be automatically communicated to the service provider associated with the grid power source 32 for indicating the location and expected duration/restoration time of the power outage without any necessary actions being taken by the user associated with the vehicle 12. The power outage map 92 may also be communicated to the vehicle 12 and to the one or more additional electrified vehicles $\mathbf{12_N}$ who may be located at charging locations that could be affected by the detected power outage. The power outage map 92 may be displayed on the HMI 44 and/or the personal electronic device 58 associated with each respective vehicle 12 to $\mathbf{12_N}$, for example.

In some instances, the charging location L1 of the vehicle 12 may be at the location of the structure 14, such as when the vehicle 12 is charging or transferring energy while at home. The charging location L1 could alternatively be at any other charging-enabled structure, such as any public charging station, when the vehicle 12 is charging or transferring energy while away from home.

Figures 5, 6:
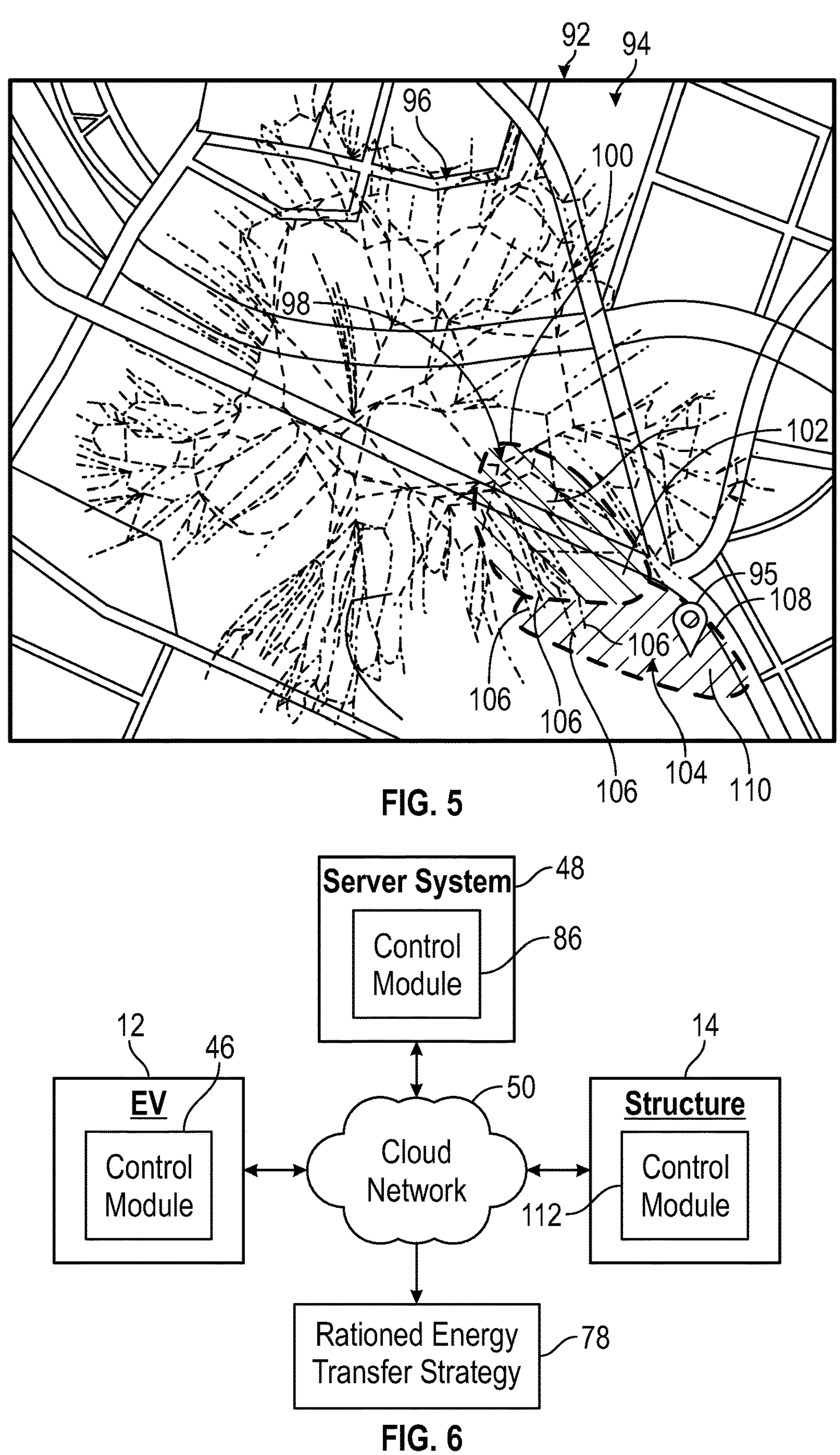
FIG. 5 illustrates an exemplary power outage map.
FIG. 6 schematically illustrates another exemplary bidirectional energy transfer system.

An exemplary power outage map 92 is illustrated in FIG. 5. The power outage map 92 may include a street map 94 and a power grid overlay 96. The power grid overlay 96 is representative of a network of power line branches associated with the grid power source 32. The power grid overlay 96 may be overlaid onto the street map 94 to provide a visual indication of the network of power line branches. A location of the detected power outage may be marked by a power outage location indicator 95 within the power outage map 92.

Locations of restored power may also be marked within the power outage map 92. For example, a power outage restored zone 98 may be demarcated within the power outage map 92 for indicating the area of the street map 94 that was previously affected by the detected power outage but that has since been experienced power restoration. The power outage restored zone 98 may be delineated by an outer border 100 and shading 102. In an embodiment, the outer border 100 is a dashed line and the shading 102 is a green colored shading. However, other configurations are also possible within the scope of this disclosure.

A predicted power outage restored zone 104 may further be indicated within the power outage map 92. The predicted power outage restored zone 104 may indicate the area of the street map 94 that is likely to have its power restored in the near future and could optionally provide an estimate of the power restoration time. In an embodiment, the predicted power outage restored zone 104 is inferred by identifying branches 106 of the power grid overlay 96 that are located downstream from the power outage restored zone 98. The predicted power outage restored zone 104 may be delineated by an outer border 108 and shading 110. In an embodiment, the outer border 108 is a dashed line and the shading 110 is a different colored shading (e.g., an amber colored shading, etc.) than the shading 102 associated with the power outage restored zone 98. However, other configurations are also possible within the scope of this disclosure.

Referring now again primarily to FIG. 3, based at least on the vehicle information 82, the control module 46 may be programmed to determine an amount of excess energy available from the traction battery pack 16 for supporting the electrical loads 31 of the structure 14 for the expected duration of a given power outage condition. The excess energy available from the traction battery pack 16 is the amount of energy available after subtracting the energy necessary for achieving a planned utilization of the traction battery pack 16 from the current amount of energy stored in the traction battery pack 16. The planned utilization of the traction battery pack 16 may be derived based on the calculated energy amounts necessary for powering the vehicle 12 for travel along upcoming pre-planned travel routes, maintaining predefined range reserves, etc.

In another embodiment, the control module 46 may be programmed to automatically command an energy transfer from the vehicle 12 to the structure 14 in response to a detected power outage condition. The energy transfer may be automatically commanded immediately upon detecting the power outage condition and may be conducted for a predefined amount of time (e.g., two minutes) in order to support power down protocols and user communications with the electrical loads 31 (e.g., Wi-Fi router, sump pump status, temperature levels of refrigerator/freezer, HVAC system, etc.). The control module 46 may further communicate with smart appliances of the electrical loads 31 to determine what stage each appliance is within its operating cycle and for determining an amount of time necessary for completing each operating cycle, for example.

When the predefined amount of time has expired, the control module 46 may notify the user, such as via one or more messages presented on the HMI 44 and/or the personal electronic device 58, of the need to select/modify certain bidirectional energy transfer settings (e.g., automatic versus manual energy transfer). When the user selects "Automatic," the energy transfer may be continued to support continued operation of previously selected critical appliances and/or strategic rationing profile preferences. When the user selects "Manual," the energy transfer may be momentarily halted to allow the user time to provide a manual selection of the desired strategic rationing profile preference, etc.

In another embodiment, based at least in part on the amount of excess energy available from the traction battery pack, 16, the household information 80, the power outage duration estimate 84, and the selected strategic rationing profile preference 85, the control module 46 may be programmed to generate the rationed energy transfer strategy 78. The rationed energy transfer strategy 78 may establish the various parameters, protocols, and/or instructions (e.g., amount of energy to be transferred, total time of energy transfer, etc.) that will be used to control the energy transfer from the traction battery pack 16 to the structure 14 for the duration of the power outage condition.

In yet another embodiment, the control module 46 may be programmed to command that one or more prompts/notifications be communicated to the user of the vehicle 12, such as when the vehicle 12 is unable to meet the energy demand of the electrical loads 31. The prompts/notifications may be displayed as a message on the HMI 44 and/or the personal electronic device 58, for example, and may include prompts for adjusting the strategic rationing profile preferences, prompts for requesting charging of the traction battery pack 16 to support the electrical loads 31, prompts for indicating the need for vehicle servicing, etc.

In the embodiments described above, the control module 46 of the vehicle 12 may be configured to function as the communications hub of the system 10. However, other embodiments are also contemplated within the scope of this disclosure. For example, as shown in FIG. 6, the control module 86 of the server system 48 (e.g., a cloud-based control module) and/or a control module 112 associated with the structure 14 could be configured to function as the communications hub of the system 10. In yet another embodiment, the respective control modules of each of the vehicle 12, the structure 14, and the server system 48 may operate together over the cloud network 50 to establish a control system for controlling the functionality of the system 10, such as coordinating and executing the rationed energy transfer strategy 78 that is most appropriate for any given situation during power outage conditions.

Figure 7A:
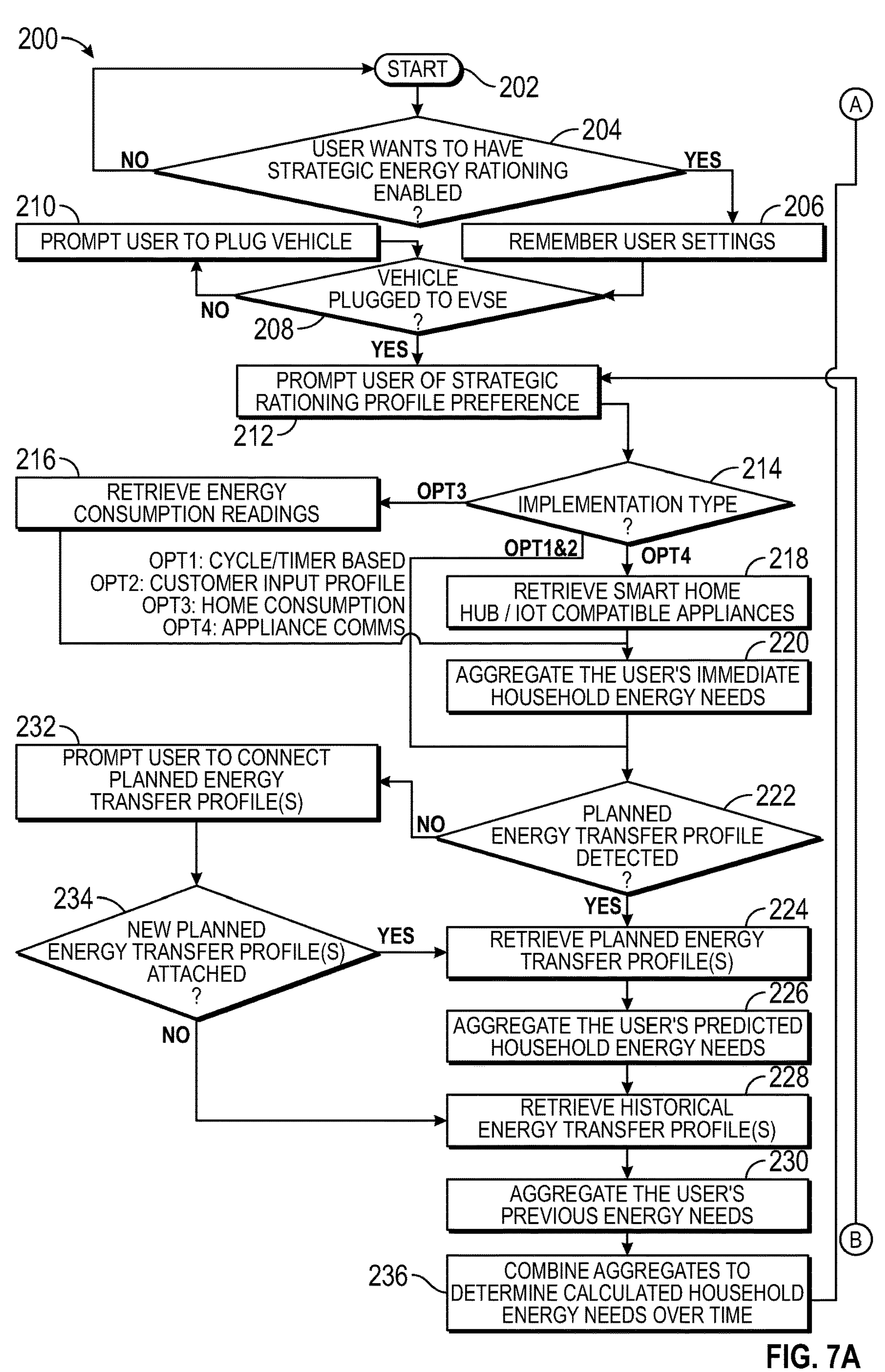
FIGS. 7A, 7B, and 7C illustrate an exemplary method for coordinating and providing strategic vehicle energy rationing for supporting household loads during electrical grid power outage conditions.
Figure 7B:
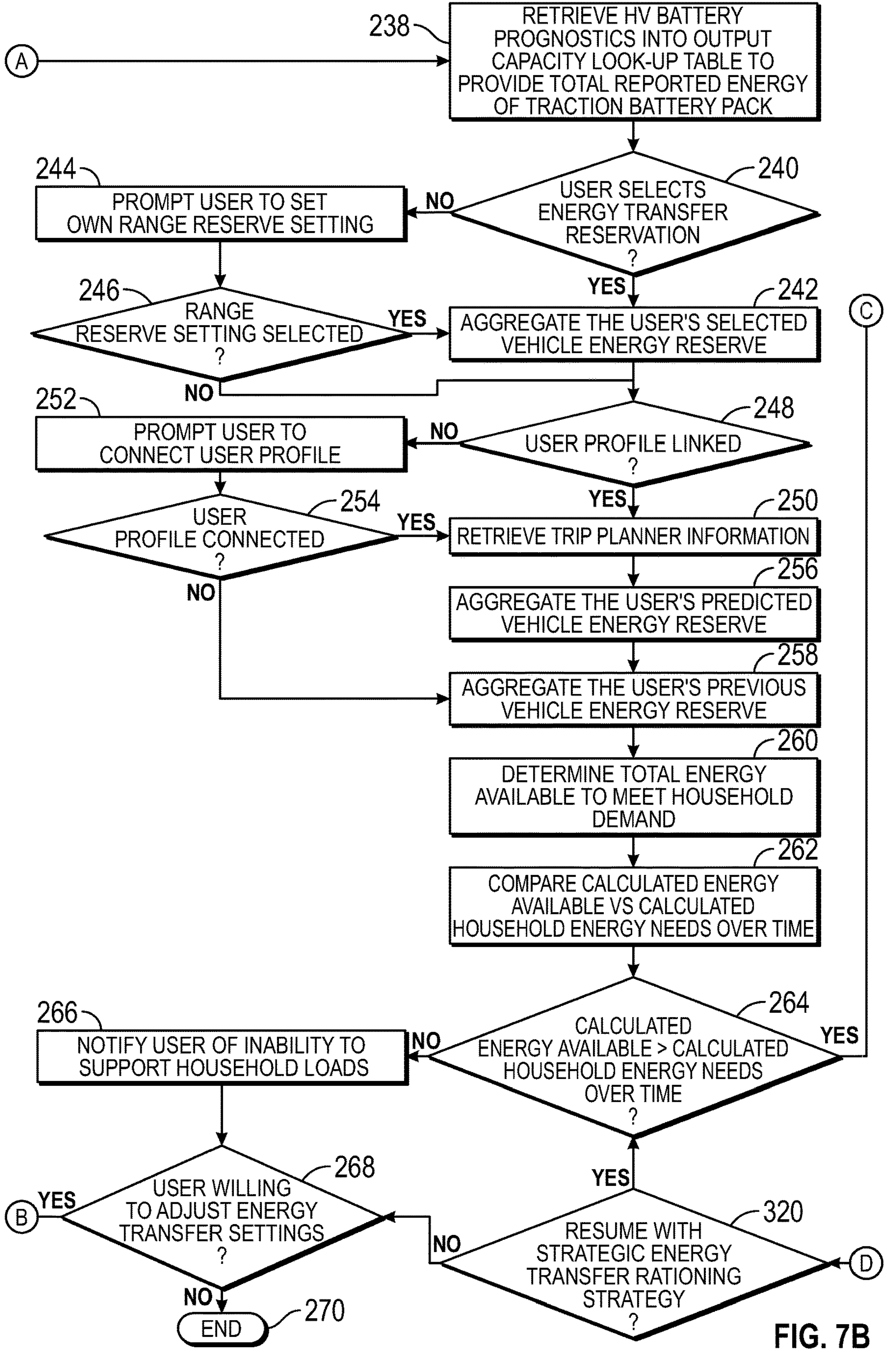
Figure 7C:
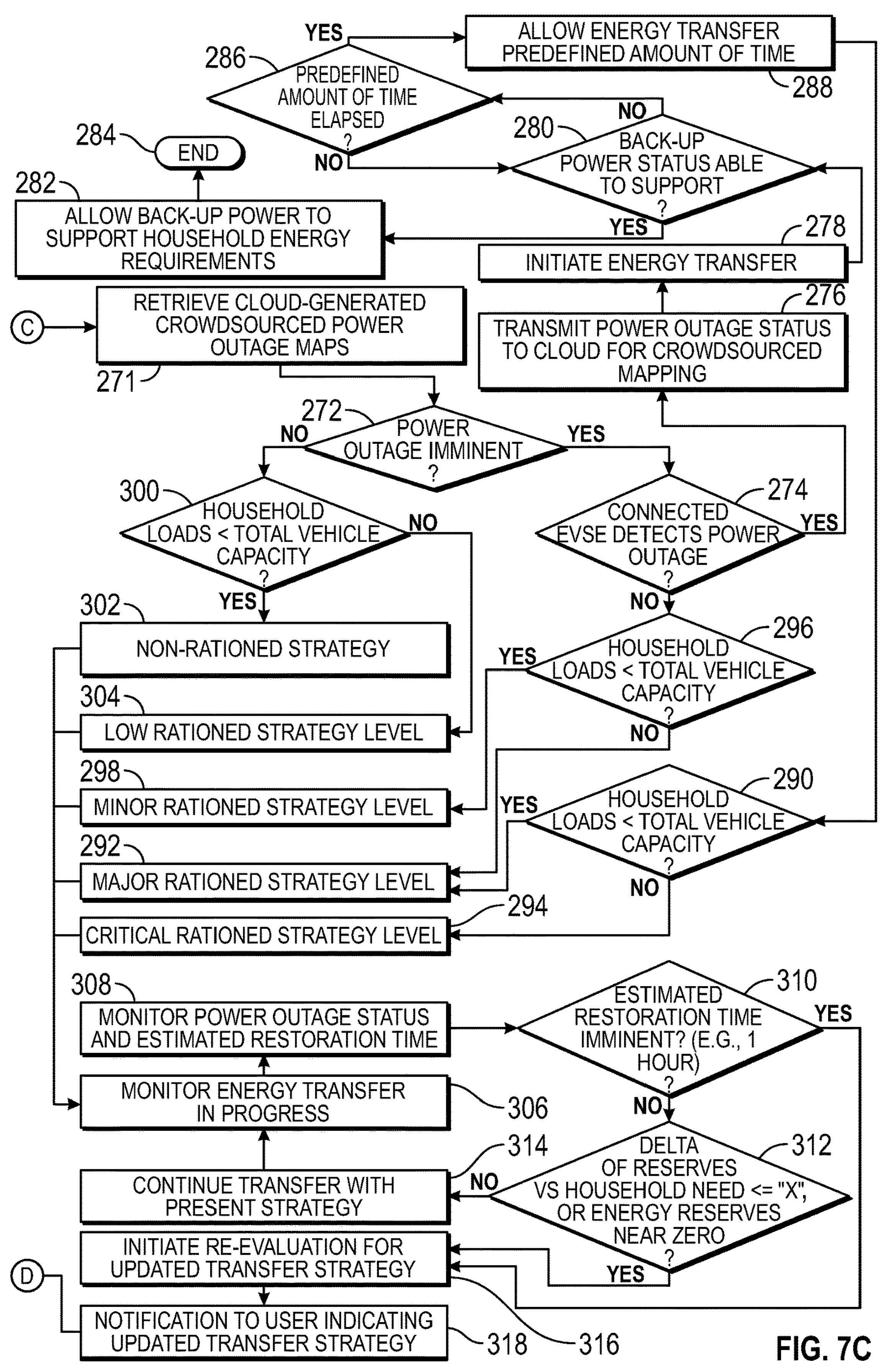

FIGS. 7A, 7B, and 7C, with continued reference to FIGS. 1-6, schematically illustrate in flow chart form an exemplary method 200 for selecting and executing the rationed energy transfer strategy 78 that is most appropriate for any given situation/condition indicated by the vehicle 12, the traction battery pack 16, the structure 14, the grid power source 32, etc., during power outage conditions of the grid power source 32. The system 10 may be configured to employ one or more algorithms adapted to execute at least a portion of the steps of the exemplary method 200. For example, the method 200 may be stored as executable instructions in the memory 76 of the control module 46, and the executable instructions may be embodied within any computer readable medium that can be executed by the processor 74 of the control module 46. The method 200 could alternatively or additionally be stored as executable instructions in the memories of the control module 86 of the server system 48 and/or the control module 112 of the structure 14.

The exemplary method 200 may begin at block 202. At block 204, the method 200 may determine whether the user of the vehicle 12 desires to strategically support the electrical loads 31 of the structure 14 during power outage conditions of the grid power source 32. If YES, the method 200 may first proceed to block 206 by saving user settings and may then proceed to block 208 by determining whether or not the vehicle 12 is plugged-in (e.g., whether the charge cable 24 is currently connected to the charge port assembly 26 of the vehicle 12 and the EVSE 22). If NO, the user of the vehicle 12 may be prompted to plug-in the vehicle 12 at block 210. Alternatively, if a YES flag is returned at block 208, the method 200 may proceed to block 212 by prompting the user to make his/her desired strategic rationing profile preferences. The prompt may be provided on the HMI 44 and/or the personal electronic device 58, for example.

The method 200 may next determine what type of strategic rationing profile preference implementation has been selected at block 214. If the cycle/timer based implementation or the customer input profile implementation has been selected, the method 200 may immediately proceed to block 222 (discussed below). If, however, the home consumption implementation has been selected, the method 200 may retrieve energy consumption (e.g., smart meter) readings from the structure 14 at block 216. Alternatively, if the appliance communication implementation has been selected, the method 200 may retrieve all relevant appliance profiles at block 218. The immediate total energy needs of the structure 14 may then be aggregated at block 220.

At block 222, the method 200 may determine whether any planned energy transfer profiles have been detected. Planned energy transfer profiles may include appliance settings that are scheduled to occur at a later time, such as those from a smart thermostat, for example. If YES, the planned energy transfer profiles may be retrieved at block 224, and the user's predicted energy needs for the structure 14 may then be aggregated at block 226.

At block 228, a historical energy transfer profile associated with the structure 14 may be retrieved, such as from the server system 48 or from a smart meter, for example. The historical energy transfer profile may include energy logs of previous energy usages associated with the structure 14, for example. The user's previous energy needs for the structure 14 may then be aggregated at block 230.

Alternatively, if a NO flag is returned at block 222, the method 200 may proceed to block 232 by prompting the user to indicate if they wish to link a planned energy transfer profile to the system 10. The method 200 may then determine whether a planned energy transfer profile has been linked at block 234. The method 200 may proceed to either block 224 or block 228 from block 234, depending on whether or not a planned energy transfer profile was linked at block 234.

The total energy requirements needed to support the electrical loads 31 of the structure 14 may be calculated at block 236. This step may include aggregating the immediate energy needs (from block 220), the predicted energy needs (from block 226), and the previous energy needs (from block 230) associated with the structure 14.

Next, at block 238, the method 200 may retrieve battery prognostic information (e.g., derived from the vehicle information 82) and output the battery prognostic information into an output capacity lookup table to provide a total reported energy of the traction battery pack 16. In an embodiment, the output capacity lookup table is stored in the memory 76 of the control module 46.

The method 200 may determine whether any energy transfer preferences, such as preferences for range reservations, for example, have been selected by the user at block 240. If YES, the method 200 may aggregate the user's selected energy reserve for the traction battery pack 16 at block 242. If NO, the method 200 may proceed to block 244 by prompting the user to select a desired amount of range reserve. The method 200 may then determine whether a range reservation has been selected at block 246. The method 200 may proceed to either block 242 or block 248 from block 246, depending on whether or not a range reservation has been made.

At block 248, the method 200 may determine whether a user profile associated with the owner of the vehicle 12 and/or structure 14 has been linked to the system 10. If YES, trip planner information associated with the user may be retrieved at block 250. If NO, the method 200 may instead proceed to block 252 by prompting the user to indicate whether they wish to link a user profile to the system 10. The method 200 may then determine whether a user profile has been linked at block 254. The method 200 may proceed to either block 250 or block 258 from block 254, depending on whether or not a user profile has been linked.

The user's predicted energy reserve of the traction battery pack 16 may be aggregated at block 256. The user's previous energy reserve of the traction battery pack 16 may also be aggregated at block 258.

The portion of energy of the traction battery pack 16 that is available to contribute to the electrical loads 31 of the structure 14 may next be calculated at block 260. If the selected energy reserve (from block 240) is less than or equal to the sum of the predicted energy reserve (from block 256) and the previous energy reserve (from block 258), then the portion of energy of the traction battery pack 16 that is available to contribute may be calculated by subtracting the sum of the predicted energy reserve and the previous energy reserve from the total reported energy of the traction battery pack 16. Otherwise, the selected energy reserve may be simply subtracted from the total reported energy of the traction battery pack 16 to calculate the portion of energy that is available to contribute to the transient loads of the structure 14.

Next, at block 262, the portion of energy of the traction battery pack 16 that is available to contribute to support the electrical loads 31 of the structure 14 (from block 260) may be compared to the total energy requirements of the structure 14 (from block 236). The method 200 may then, at block 264, determine whether the portion of the energy available from the traction battery pack 16 exceeds the total energy requirements of the structure 14. If NO, the method 200 may proceed to block 266 by notifying the user of the inability to support the household loads under the current energy transfer settings. The method 200 may determine if the user is willing to adjust the energy transfer settings at block 268. If YES, the method 200 may return to block 212. If NO, the method 200 may end at block 270.

Alternatively, if a YES flag is returned at block 264, the method 200 may proceed to block 271. At this step, the method 200 may access the power outage map 92 from the server system 48 and/or communicate with the grid data server 55. The method 200 may then determine whether a power outage condition at the location of the vehicle 12 and/or the structure 14 is imminent at block 272. The power outage condition may be considered imminent when a confirmed power outage is detected within a predefined distance from the location of the vehicle 12 and/or the structure 14.

If the power outage condition is imminent, the method 200 may proceed to block 274 by confirming whether the vehicle 12 has detected the power outage condition (e.g., by receiving a signal from the EVSE 22). If YES, the method 200 may, at block 276, transmit the power outage status to the server system 48 for contributing to the aggregated power outage mapping functions.

The energy transfer from the vehicle 12 to the structure 14 may be initiated at block 278. At block 280, the method 200 may determine whether the structure 14 has back-up power available for supporting the household electrical loads 31. If YES, the method 200 allows the back-up power to support the household energy requirements at block 282, and the method 200 may then end at block 284. If NO, the method 220 may determine whether a predefined amount of time has elapsed since detecting that the power outage is imminent at block 286. If YES, the method 200 proceeds to block 288 by allowing the energy transfer to continue for a predefined amount of time (e.g., about two minutes). The method 200 may then proceed to block 290.

At block 290, the method 200 may determine whether the electrical loads 31 of the structure 14 are less than the total available energy from the traction battery pack 16. If YES, the major rationed strategy level may be selected at block 292. If NO, the critical rationed strategy level may be selected at block 294. The critical rationed strategy level is considered at higher severity strategy level compared to the major rationed strategy level.

Alternatively, if a NO flag is returned at block 274, the method 200 may proceed to block 296 instead of block 276.

At block 296, the method 200 may assess whether the electrical loads 31 of the structure 14 are less than the total available energy from the traction battery pack 16. If YES, the minor rationed strategy level may be selected at block 298. If NO, the major rationed strategy level may be selected at block 292. The major rationed strategy level is considered a higher severity strategy level compared to the minor rationed strategy level.

If the power outage condition is not determined to be imminent at block 272, the method 200 may proceed to block 300 instead of block 274. At block 300, the method 200 may assess whether the electrical loads 31 of the structure 14 are less than the total available energy from the traction battery pack 16. If YES, a non-rationed energy transfer strategy may be selected at block 302. If NO, the low rationed strategy level may be selected at block 304. The low rationed strategy level is considered a higher severity strategy level compared to the non-rationed strategy, but is a lower severity strategy compared to the minor rationed strategy level.

The method 200 may proceed to block 306 from any of blocks 292, 294, 298, 302, or 304. At block 306, the energy transfer progress from the vehicle 12 to the structure 14 may be monitored. Furthermore, the power outage status and estimated restoration time of the grid power source 32 may be monitored at block 308.

The method 200 may determine whether the estimated power restoration time of the grid power source 32 is imminent at block 310. The power restoration time may be considered imminent if it is likely to occur within a threshold amount of time (e.g., one hour). If NO, the method 200 may proceed to block 312 by determining whether the difference between the amount of energy available for rationing from the traction battery pack 16 and the electrical needs of the structure 14 is less than or equal to a predefined threshold (or if the amount of energy available for rationing is near zero). If NO, the method 200 proceeds to block 314 by continuing with the current energy transfer strategy.

The method 200 may proceed to block 316 if YES flag is returned at either block 310 or block 312. At this step, the method 200 may initiate a re-evaluation of the current energy transfer strategy. The user may be notified of an updated energy transfer strategy at block 318.

The method 200 may determine whether to resume the strategic energy transfer rationing strategy at block 320. If YES, the method 200 may return to block 264. If NO, the method 200 may once again determine if the user is willing to adjust the energy settings at block 268. If YES, the method 200 may return to block 212. If NO, the method 200 may end at block 270.

The bidirectional energy transfer systems of this disclosure are designed to support critical loads of a household/structure during power outage conditions (or during vacation modes) by rationing available vehicle energy until power has been restored. Rather than supporting household appliances/loads (e.g. sump-pump, freezer, etc.) with constant energy during power outages, which could quickly drain the traction battery pack, the disclosed systems/methods allow for strategic rationing of bidirectional energy transfer in order to extend appliance/load operation. Critical appliance operation may therefore be ensured for the duration of the power outage condition.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A bidirectional energy transfer system, comprising:

a traction battery pack; and a control module programmed to (1) prepare a rationed energy transfer strategy for controlling a bidirectional energy transfer output from the traction battery pack to a structure that includes one or more electrical loads, and (2) control the bidirectional energy transfer output from the traction battery pack to the structure based on a power outage restoration estimate associated with a grid power source, wherein the rationed energy transfer strategy is derived at least in part based on a user-selected strategic rationing profile preference, wherein the control module is further programmed to select a strategy level that indicates an amount of energy transfer that will be permitted to occur during the bidirectional energy transfer output based at least on the user-selected strategic rationing profile preference, wherein the strategy level includes one of a low rationed strategy level, a minor rationed strategy level, a major rationed strategy level, and a critical rationed strategy level.

2. The bidirectional energy transfer system as recited in claim 1, wherein the control module is a component of a vehicle that is powered by the traction battery pack.

3. The bidirectional energy transfer system as recited in claim 1, wherein the control module is a component of a cloud-based server system or the structure that is configured to receive the bidirectional energy transfer output from the traction battery pack.

4. The bidirectional energy transfer system as recited in claim 1, wherein the structure is a household associated with a vehicle that is powered by the traction battery pack.

5. The bidirectional energy transfer system as recited in claim 1, wherein the rationed energy transfer strategy is determined based on household information associated with the structure, vehicle information associated with a vehicle that is powered by the traction battery pack, the user-selected strategic rationing profile preference, and the power outage restoration estimate.

6. The bidirectional energy transfer system as recited in claim 5, wherein the user-selected strategic rationing profile preference includes a cycle/timer based implementation, a user input profile implementation, a home consumption implementation, or an appliance communication implementation.

7. The bidirectional energy transfer system as recited in claim 1, wherein the rationed energy transfer strategy is configured for powering the one or more electrical loads of the structure for a duration of a power outage condition.

8. The bidirectional energy transfer system as recited in claim 1, wherein the power outage restoration estimate is derived from a cloud-generated power outage map.

9. The bidirectional energy transfer system as recited in claim 1, wherein the power outage restoration estimate is derived from an announcement from a grid data server.

10. The bidirectional energy transfer system as recited in claim 8, wherein the cloud-generated power outage map is aggregated from vehicle data received from a plurality of electrified vehicles.

11. The bidirectional energy transfer system as recited in claim 1, wherein the user-selected strategic rationing profile preference includes a cycle/timer based implementation, a user input profile implementation, a home consumption implementation, or an appliance communication implementation.

12. The bidirectional energy transfer system as recited in claim 1, wherein the power outage restoration estimate is derived from a cloud-generated power outage map.

13. The bidirectional energy transfer system as recited in claim 12, wherein the cloud-generated power outage map is aggregated from vehicle data received from a plurality of electrified vehicles.

14. The bidirectional energy transfer system as recited in claim 12, wherein the cloud-generated power outage map includes a street map, a power grid overlay overlaid onto the street map, a power outage restored zone for indicating a first area of the street map that was previously affected by a power outage, and a predicted power outage restored zone for indicating a second area of the street map that is likely to have its power restored in a near future.

15. The bidirectional energy transfer system as recited in claim 14, wherein the predicted power outage restored zone is inferred by identifying at least one branch of the power grid overlay that is located downstream from the power outage restored zone.

16. The bidirectional energy transfer system as recited in claim 1, wherein the control module selects the strategy level based on whether a restoration of the grid power source is imminent or non-imminent.

17. The bidirectional energy transfer system as recited in claim 1, wherein the control module is further programmed to periodically reevaluate the strategy level in response to changes in outage-restoration estimates, household load changes, and/or battery prognostic data.

18. A bidirectional energy transfer system, comprising:

a traction battery pack; and a control module programmed to (1) prepare a rationed energy transfer strategy for controlling a bidirectional energy transfer output from the traction battery pack to a structure that includes one or more electrical loads, and (2) control the bidirectional energy transfer output from the traction battery pack to the structure based on a power outage restoration estimate associated with a grid power source, wherein the rationed energy transfer strategy is derived at least in part based on a user-selected strategic rationing profile preference, wherein the user-selected strategic rationing profile preference includes a user selection of a strategy level that indicates an amount of energy transfer that will be permitted to occur during the bidirectional energy transfer output, wherein the rationed energy transfer strategy is determined based on household information associated with the structure, vehicle information associated with a vehicle that is powered by the traction battery pack, the user-selected strategic rationing profile preference, and the power outage restoration estimate, wherein the user-selected strategic rationing profile preference includes a cycle/timer based implementation, a user input profile implementation, a home consumption implementation, or an appliance communication implementation, wherein each of the cycle/timer based implementation, the user input profile implementation, the home consumption implementation, and the appliance communication implementation includes at least a low rationed strategy level, a minor rationed strategy level, a major rationed strategy level, and a critical rationed strategy level.

19. A bidirectional energy transfer system, comprising:

a traction battery pack; and a control module programmed to (1) prepare a rationed energy transfer strategy for controlling a bidirectional energy transfer output from the traction battery pack to a structure that includes one or more electrical loads, and (2) control the bidirectional energy transfer output from the traction battery pack to the structure based on a power outage restoration estimate associated with a grid power source, wherein the rationed energy transfer strategy is derived at least in part based on a user-selected strategic rationing profile preference, wherein the user-selected strategic rationing profile preference includes a user selection of a strategy level that indicates an amount of energy transfer that will be permitted to occur during the bidirectional energy transfer output, wherein the power outage restoration estimate is derived from a cloud-generated power outage map, wherein the cloud-generated power outage map is aggregated from vehicle data received from a plurality of electrified vehicles, wherein the cloud-generated power outage map includes a street map, a power grid overlay overlaid onto the street map, a power outage restored zone for indicating a first area of the street map that was previously affected by a power outage, and a predicted power outage restored zone for indicating a second area of the street map that is likely to have its power restored in a near future.

20. The bidirectional energy transfer system as recited in claim 19, wherein the predicted power outage restored zone is inferred by identifying at least one branch of the power grid overlay that is located downstream from the power outage restored zone.

* * * * *